Patented Nov. 15, 1938

2,136,782

UNITED STATES PATENT OFFICE 2,136,782

NONYELLOWING COMPOSITION

Edmond H. Bucy, Stamford, Conn., assignor to Atlas Powder Company, Wilmington, Del., a corporation of Delaware No Drawing. Application August 22, 1936, Serial No. 97,344

5 Claims. (Cl. 134—58)

This invention pertains to compositions and more particularly to such compositions which contain an ingredient which normally tends to yellow upon aging in the composition prior to use or as a finished article or coating.

An object of my invention is the production of non-yellowing compositions.

Another object of my invention is the production of non-yellowing plastic and liquid coating compositions.

A further object of my invention is the production of non-yellowing fabrics, paper, and coated and/or impregnated bases such as wood, leather, paper, fabrics, metal, metal foil, stucco, stone, and concrete.

A still further object of my invention is the production of an admixture material to reduce or prevent the yellowing of the material with which it is to be admixed.

A still further object of my invention is the production of a substantially colorless bluing agent which develops a blue coloration upon aging.

A still further object of my invention is the production of a non-yellowing white pigment.

It is well known to those skilled in the art that certain pigments tend to yellow upon aging or exposure to the sunlight, ultraviolet light, or heat. This is especially true of white pigments such as titanium dioxide, zinc sulphide, lithopone, zinc oxide, and other commercial white pigments. Certain ingredients used in coating or impregnating compositions and certain plastics show a similar yellowing tendency. Thus, cellulose derivative lacquers, pigmented or unpigmented oil varnishes, pigment dispersions, leather finishes, white shoe polishes, pigmented or unpigmented varnishes having a synthetic resin base such as polybasic acid—polyhydric alcohol resin, especially when modified during manufacture with drying oils or drying oil fatty acids, plain or oil-modified phenol-formaldehyde resin, cumarone resin, and aqueous dispersions of such yellowing resins, are examples of coating and impregnating compositions which yellow. Cast phenol-formaldehyde products display considerable yellowing tendencies, as do plastic containing drying oils, cellulose derivatives, particularly nitrocellulose, and natural and synthetic resins such as unmodified or oil-modified phenol-formaldehyde resins, drying oil and drying oil fatty acid modified "glyptals", cumarone resins, etc. Paper, lacquer-coated paper, sized paper, textiles, sized, filled, coated, or impregnated textiles, oil-cloth, and other coated and impregnated materials show this yellowing. My invention is applicable to all of the materials which I have just referred to. It is also applicable to all materials, pigments or compositions of matter which show this undesirable yellowing tendency and is not to be construed as being limited to the applications which I have enumerated.

It is also to be understood that my invention is not to be limited to any particular theory as to the cause of the yellowing. It is applicable whether the yellowing is attributable to the presence of fabric, paper, pigment, plasticizer, vehicle, plastic, impurities, or more than one of these materials.

I have discovered that by the admixture of a small amount of molybdenum trioxide ($MoO_3$) which shows a bluing effect on exposure to light and/or heat with the material which shows a yellowing tendency on aging that the yellowing to which the material would normally be subject is counteracted.

The proportion of molybdenum oxide to be used will vary, as will be apparent to those skilled in the art, in accordance with the nature of the material with which it is to be used. Thus I may use from .01% to as high as 5 to 10% of molybdenum oxide by weight based on the total pigment in the formula in the case of pigmented compositions. I may use similar proportions of molybdenum oxide in the blend with the white pigments hereinbefore referred to. Where a yellowing vehicle or plasticizer is present, the proportion may be greater. Thus with an oil vehicle, the proportion will necessarily be considerably greater. The proportion will also vary with the degree of dispersion of the total pigment, being greater the higher this degree.

If desired, I may use molybdenum oxide as the sole pigment in plastic or liquid coating compositions, or I may use it in less than pigmenting proportions solely to counteract the yellowing tendencies of such compositions. This feature of my invention is particularly adapted to transparent compositions with which I admix in any usual manner such small proportions that the transparency is not substantially reduced; while the yellowing tendencies are overcome.

Where I have made reference to use of molybdenum oxide with pigments, I contemplate a mixture prepared by any suitable method, as by simple mixing, grinding, etc. Either a dry mixture or a fluent or paste-like dispersion in water, petroleum naphtha, and the like, of the molybdenum oxide and the pigment or pigments may be prepared. These may be used as such or directly added to, ground into or dispersed in a drying oil, a varnish base, a base containing a natural or synthetic resin, solutions of cellulose derivatives, or any plastic or liquid coating composition.

Similarly, where I refer to molybdenum oxide I contemplate either the dry powdered material or a fluent or paste-like dispersion of the same in water, petroleum naphtha, or the like.

Below I have given several specific examples of some of the modes of carrying my invention into practice. It will be apparent, however, to those skilled in the art, that other proportions and other ingredients may be used within the spirit of my invention. The use of such other proportions and ingredients will necessitate different proportions of the molybdenum oxide. My invention is to be construed as limited only insofar as defined in the appended claims.

EXAMPLE No. 1

*Pigmented nitrocellulose lacquer*

| | | |
|---|---|---|
| Dibutyl phthalate | oz | 6 |
| Nitrocellulose—½ sec | lb | 1 |
| Dammar resin | lb | 1 |
| Titanium dioxide | lbs | 2½ |
| Molybdenum oxide ($MoO_3$) | oz | .2 |

All by weight incorporated into one gallon of solvent made up of:

| | Per cent |
|---|---|
| Butyl acetate | 20 |
| Butyl alcohol | 5 |
| Ethyl acetate | 20 |
| Cellosolve acetate (monoethyl ether of ethylene glycol acetate) | 5 |
| Toluol (commercial toluene) | 50 |

These ingredients may be incorporated in any suitable manner as by putting them all into a pebble mill which is allowed to run until an adequate dispersion is obtained.

Nitrocellulose shows comparatively slight yellowing, and therefore, a very small amount of molybdenum oxide (in this example, .26% on the weight of the non-volatile ingredients and .5% on the total weight of the pigment) is necessary.

EXAMPLE No. 2

*Pigmented alkyd resin varnish*

In this example, a glycerol-phthalate resin modified with 30% of soya bean oil fatty acid is dissolved in xylol (commercial xylene) until a solution containing 50% solids by weight is obtained. Into one gallon of the resulting solution there is ground 4½ pounds of a pigment mixture consisting of

| | Per cent |
|---|---|
| Titanium dioxide | 99½ |
| Molybdenum oxide | ½ |

EXAMPLE No. 3

*White lead paint*

In this example, there is used ¾ to 1% of molybdenum oxide based on the total amount of white lead used in the usual white lead—linseed oil paint.

EXAMPLE No. 4

*Non-yellowing white cloth*

Any white cloth which shows yellowing tendencies upon aging has incorporated within and upon its fibers .01–1% of molybdenum oxide by weight. The resulting cloth does not become yellow upon aging. This treatment is also applicable to unwoven textile fibers such as threads or yarn.

EXAMPLE No. 5

*Non-yellowing paper*

The paper, instead of being sized with the usual paper size, is sized during or subsequent to manufacture with a size containing .01–10% of molybdenum oxide on the total weight of the pigment in the size. The paper thus treated shows outstanding resistance to development of yellowing.

I may supply to the trade pure molybdenum oxide to be added to the material to be rendered non-yellowing at the job or place of manufacture. This is, I believe, a new article of commerce which I call "a substantially colorless bluing pigment", meaning thereby a pigment which is normally substantially colorless, but which develops a blue color upon aging, as, for example, upon exposure to light and/or heat. Normally molybdenum trioxide has a light yellowish color with a faint green cast when in the cold. Its opacity is not high so that small amounts do not interfere with the normal pigments with which it may be used. It develops a blue coloration more or less in proportion to the amount of heat and/or light to which it is exposed. Usually these same, or similar, conditions are those under which normal coatings or plastics tend to turn yellow.

While the molybdenum oxide shows advantageous results when used with white pigments, it is not necessary that it be so used. Instead, it may be used with any pigment or in any pigmented formula where it is desirable to neutralize a normal yellowing.

The advantageous results of my invention will be at once apparent to those skilled in the art. The principal result is that articles produced in accordance with the principles of my invention do not yellow upon exposure to sunlight, ultra-violet light, or to heat, or upon aging, but retain their original color much better.

In the appended claims, by "aging", I refer to exposure to heat, to exposure to light, to the passage of time or to combinations of these effects, which is the usual meaning of this word in the arts.

Having described my invention, what I claim is:

1. A non-yellowing article of manufacture comprising a normally colorless or white pigmented material which develops a yellow color upon aging and intimately and homogeneously incorporated therewith substantially colorless molybdenum trioxide in an amount that is sufficient but not in excess of that required to counteract the yellow color developed by said material upon aging of the article, by the blue color developed by the molybdenum trioxide upon aging thereof.

2. A non-yellowing composition of matter comprising a normally colorless or white pigmented material which develops a yellow color upon aging and intimately and homogeneously incorporated therewith substantially colorless molybdenum trioxide in an amount that is sufficient but not in excess of that required to counteract the yellow color developed by said material upon aging of the composition, by the blue color developed by the molybdenum trioxide upon aging thereof.

3. A non-yellowing plastic composition comprising a normally colorless or white pigmented material which develops a yellow color upon aging and intimately and homogeneously incorporated therewith substantially colorless molybdenum trioxide in an amount that is sufficient but not in excess of that required to counteract the yellow color developed by said material upon aging of the composition, by the blue color developed by the molybdenum trioxide upon aging thereof.

4. A non-yellowing coating composition comprising a normally colorless or white pigmented material which develops a yellow color upon aging and intimately and homogeneously incorporated therewith substantially colorless molybdenum trioxide in an amount that is sufficient but not in excess of that required to counteract the yellow color developed by said material upon aging of the composition, by the blue color developed by the molybdenum trioxide upon aging thereof.

5. A non-yellowing pigment comprising a normally colorless or white pigment which develops a yellow color upon aging and intimately and homogeneously incorporated therewith substantially colorless molybdenum trioxide in an amount that is sufficient but not in excess of that required to counteract the yellow color developed upon aging of the pigment, by the blue color developed by the molybdenum trioxide upon aging thereof.

EDMOND H. BUCY.